US012799803B2

(12) United States Patent
Scarfo et al.

(10) Patent No.: US 12,799,803 B2
(45) Date of Patent: Nov. 17, 2026

(54) PRE-HUNG DOOR ASSEMBLY AND METHOD FOR THE SAME

(71) Applicant: ASSA ABLOY Americas Residential Inc., New Haven, CT (US)

(72) Inventors: Louis Scarfo, Westfield, MA (US); Heidi Gesicki, Lititz, PA (US); Deron Harvey, Roachdale, IN (US); Michael Gary Koester, Houston, TX (US); Mark Stephen Snapp, Jr., Humble, TX (US)

(73) Assignee: ASSA ABLOY Americas Residential Inc.

( * ) Notice: Subject to any disclaimer, the term of this patent is extended or adjusted under 35 U.S.C. 154(b) by 176 days.

(21) Appl. No.: 18/527,584

(22) Filed: Dec. 4, 2023

(65) Prior Publication Data

US 2024/0183214 A1 Jun. 6, 2024

Related U.S. Application Data

(60) Provisional application No. 63/430,431, filed on Dec. 6, 2022.

(51) Int. Cl.
*E06B 1/18* (2006.01)

(52) U.S. Cl.
CPC ...................................... *E06B 1/18* (2013.01)

(58) Field of Classification Search
CPC ..... E06B 1/08; E06B 1/10; E06B 1/12; E06B 1/14; E06B 1/16; E06B 1/18; E06B 1/20; E06B 1/52; E06B 3/14; E06B 3/16; E06B 3/22; E06B 3/26336; E06B 2003/7088; E06B 3/726; E06B 3/728; E04H 2001/1283
See application file for complete search history.

(56) References Cited

U.S. PATENT DOCUMENTS

| | | | | |
|---|---|---|---|---|
| 1,958,124 A * | 5/1934 | Bemis | E04B 1/08 | 165/56 |
| 2,840,201 A * | 6/1958 | Anderson | E06B 1/18 | 52/846 |
| 3,596,405 A * | 8/1971 | Ingulf | E06B 1/18 | 49/504 |
| 4,226,066 A * | 10/1980 | Persson | E06B 1/64 | 49/504 |
| 4,949,771 A * | 8/1990 | Grisham | E06B 3/16 | 160/90 |

(Continued)

FOREIGN PATENT DOCUMENTS

| | | | |
|---|---|---|---|
| FR | 2886668 A1 * | 12/2006 | E05C 19/166 |
| GB | 2212541 A * | 7/1989 | E06B 1/18 |

(Continued)

OTHER PUBLICATIONS

Built Rite Ind., 2012 Catalog, 36 pages.

*Primary Examiner* — Kyle J. Walraed-Sullivan
(74) *Attorney, Agent, or Firm* — Wolf, Greenfield & Sacks, P.C.

(57) ABSTRACT

A steel door frame includes a frame member for hanging a door and a track member that forms an exterior surface of the door frame. The exterior surface of the track member forms a planar surface for being inserted into a rough opening of a corrugated wall in order to facilitate installation.

20 Claims, 11 Drawing Sheets

(56) References Cited

U.S. PATENT DOCUMENTS

| | | | | | |
|---|---|---|---|---|---|
| 5,619,823 | A * | 4/1997 | Ruff | E06B 3/9885 | 49/504 |
| 7,340,866 | B1 * | 3/2008 | Smith | E06B 1/30 | 52/745.15 |
| 8,186,110 | B2 | 5/2012 | Green | | |
| 8,534,011 | B2 | 9/2013 | Andres | | |
| 8,733,025 | B2 | 5/2014 | Baumert | | |
| 9,003,716 | B1 * | 4/2015 | Gill | E04B 1/348 | 52/211 |
| 9,068,370 | B1 | 6/2015 | Gill et al. | | |
| 9,115,501 | B2 | 8/2015 | Rucinski et al. | | |
| 9,163,423 | B1 | 10/2015 | Gill et al. | | |
| 9,376,855 | B2 | 6/2016 | Baumert | | |
| 9,624,712 | B2 | 4/2017 | Bottin | | |
| 9,631,407 | B2 | 4/2017 | Wise et al. | | |
| 9,995,080 | B2 | 6/2018 | Stevens et al. | | |
| 10,000,939 | B1 * | 6/2018 | Gill | E04H 9/14 | |
| 10,370,890 | B2 | 8/2019 | Fujishin et al. | | |
| 10,612,290 | B2 | 4/2020 | Weber | | |
| 11,276,323 | B1 | 3/2022 | Kirchner et al. | | |
| 2013/0263513 | A1 | 10/2013 | Padlon | | |
| 2015/0013250 | A1 | 1/2015 | D'Agostini | | |
| 2021/0114843 | A1 | 4/2021 | Yulkowski | | |
| 2021/0381225 | A1 * | 12/2021 | Ramos | E04B 1/388 | |
| 2021/0404245 | A1 * | 12/2021 | Satrom | E06B 7/2316 | |

FOREIGN PATENT DOCUMENTS

| | | | | |
|---|---|---|---|---|
| WO | WO-2020202550 | A1 * | 10/2020 | E06B 1/6069 |
| WO | WO-2021263078 | A1 * | 12/2021 | E06B 7/2318 |

* cited by examiner

PRE-HUNG DOOR ASSEMBLY AND METHOD FOR THE SAME

CROSS-REFERENCE TO RELATED APPLICATIONS

This application claims priority to and the benefit of U.S. Provisional Patent Application No. 63/430,431, filed Dec. 6, 2022, the disclosure incorporated by reference herein in its entirety.

BACKGROUND

Pre-hung door assemblies generally include a door frame with a door hung therein. The pre-hung door assemblies allow the door to be secured within a rough opening of a wall of a structure and are often more efficient than separately framing and hanging a door within the wall of the structure. Pre-hung door assemblies are typically available in a wide range of sizes and come in a variety of materials, including wood or wood composite, metal, fiberglass, etc. Some known frames for pre-hung door assemblies have jambs with outward extending flanges so that the pre-hung door assembly can be inserted into the rough opening and screws can be used to secure the flanges to the wall (e.g., the flanges being parallel to the wall).

This installation process is generally known to work well for wall constructions that have a planar surface (e.g., wood or steel framed walls with sheathing, concrete, concrete masonry units, etc.) for receiving the jamb flanges. However, some structures may have a wall that is not formed with a planar surface to attach the jamb flange to. For example, modular shipping containers are known to have corrugated wall panels that are not planar surfaces. As such, in some known examples, tubular steel (e.g. Hollow Structural Sections (HSS) 4×2 inches) is known to be used for fabricating a door frame on site. In such circumstances, the tubular steel may be used to construct the frame, and a door may subsequently be hung from the constructed door frame or the flanged frame as described above can be affixed to the tubular steel. Using HSS tube-steel, in particular with on-site installation, is cost and time prohibitive as well as being heavy. Accordingly, improvements are desired.

SUMMARY

The present disclosure relates generally to door frames for corrugated walls. In one possible configuration, and by non-limiting example, a pre-hung door assembly is disclosed and having a door frame with a frame member and a track member. The track member forms a planar exterior surface of the door frame so as to facilitate installation within a corrugated wall.

In an aspect, the technology relates to a door frame for a pre-hung door including: a header spanning between a pair of side jambs, wherein each of the pair of side jambs include: a frame member including: a first frame face and an opposing second frame face; a rabbet defined proximate the first frame face such that the first frame face has a first frame width, the rabbet configured to at least partially receive the pre-hung door; a soffit defined proximate the second frame face such that the second frame face has a second frame width, the second frame width being greater than the first frame width; and a first return extending from the first frame face opposite the rabbet and a second return extending from the second frame face opposite the soffit, the first return and the second return defining a throat opening allowing access into an interior cavity of the frame member; and a track member coupled to the frame member enclosing the interior cavity of the frame member, the track member including: a base and two legs extending from each end of the base, the two legs covering at least a portion of the respective first or second frame faces, wherein the base is a substantially planar surface for installing the door frame to a corresponding rough opening on a corrugated wall of a building structure.

In an example, the header includes the frame member and the track member. In another example, a sill is disposed opposite of the header between the pair of side jambs. In yet another example, one side jamb of the pair of side jambs includes at least one hinge cutout disposed at least partially within the rabbet. In still another example, another side jamb of the pair of side jambs includes a strike cutout disposed at least partially within the rabbet. In an example, the track member is welded to the frame member.

In another example, the interior cavity is at least partially sealed. In yet another example, the first frame face has a width that is less than a width of the second frame face. In still another example, a depth of the frame member between the first and second frame faces is 3¾ inches. In an example, the frame member and the track member are 16 Gauge steel.

In another aspect the technology relates to a pre-hung door assembly including: a steel door frame including a header, a first side jamb, and a second side jamb, wherein each of the header and the first and second side jambs include: a frame member including: a first frame face and an opposing second frame face; an interior wall extending between the first and second frames faces, the interior wall including a rabbet and a soffit; and a first return extending from the first frame face and a second return extending from the second frame face, the first and second returns opposite the interior wall, the first return and the second return defining a throat opening allowing access into an interior cavity of the frame member; a track member coupled to the frame member enclosing the interior cavity of the frame member, the track member including: a base and two legs extending from each end of the base, the base covering the throat of the frame member, wherein an exterior surface of the base is substantially planar for installing the door frame to a corresponding rough opening on a corrugated wall of a building structure; and a metal door mounted in the rabbet of the frame member.

In an example, the first frame face has a width that is less than a width of the second frame face. In another example, the two legs of the track member are welded to the respective first or second frame faces of the frame member. In yet another example, a sill extends between the first and second side jambs. In still another example, the second side jamb includes a strike box. In an example, the interior cavity is at least partially sealed.

In another example, a depth of the frame member between the first and second frame faces is 3¾ inches. In yet another example, the frame member and the track member are 16 Gauge steel.

In another aspect, the technology relates to a method of installing a pre-hung door assembly on a modular building having a corrugated wall, the method including: providing the pre-hung door assembly that includes a steel door frame with a frame member and a track member, the frame member having a first frame face and an opposing second frame face, an interior wall extending between the first and second frames faces, the interior wall including a rabbet and a soffit, and a first return extending from the first frame face and a second return extending from the second frame face, the first and second returns opposite the interior wall, the first return and the second return defining a throat opening allowing access into an interior cavity of the frame member, the track member is coupled to the frame member enclosing the interior cavity of the frame member, the track member including a base and two legs extending from each end of the base, the base covering the throat opening of the frame member, the pre-hung door assembly also includes a metal door mounted in the rabbet of the frame member; cutting a rough opening on the corrugated wall of the modular building; at least partially inserting the steel door frame within the rough opening, wherein an exterior surface of the base of the track member is substantially planar for receiving corrugations of the corrugated wall; and welding the corrugated wall to the exterior surface of the base of the track member.

In an example, the interior cavity of the steel door frame is at least partially sealed.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular examples of the present disclosure and therefore do not limit the scope of the present disclosure. The drawings are not to scale and are intended for use in conjunction with the explanations in the following detailed description. Examples of the present disclosure will hereinafter be described in conjunction with the appended drawings, wherein like numerals denote like elements.

DETAILED DESCRIPTION

Figure 1:
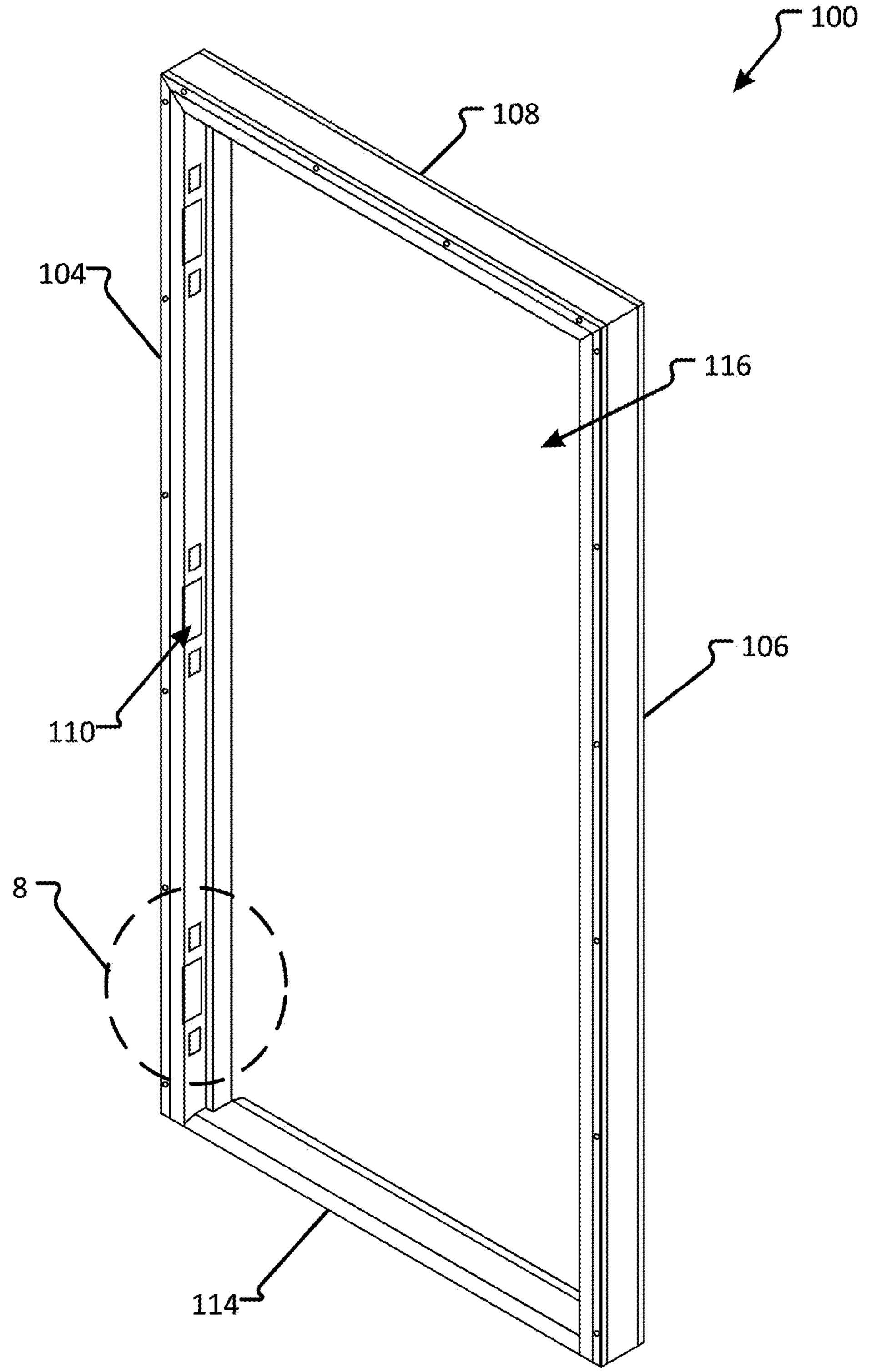
FIG. 1 is a perspective view of an exemplary door frame and in accordance with the principles of the present disclosure.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible embodiments for the appended claims.

A door frame for a pre-hung door assembly configured for use with corrugated walls, such as walls associated with modular buildings and shipping containers, is described herein. A known process for installing a door to a corrugated wall includes using tube-steel (e.g., HSS shapes) to fabricate a door frame onsite. Once the tube-steel door frame is formed, the door can be added. This process, however, is time consuming and requires a lot of heavy materials. Additionally, known pre-hung door assemblies have door frames with flanges that do not work well with a corrugated wall and result in open gaps between the flange and the wall.

In the examples described herein, the door frame is formed with a two-piece construction having a frame member forming a rabbet and a soffit for hanging the door and a track member that forms an exterior surface that is capable of more easily installing within the corrugated wall. The exterior surface is orthogonal to the corrugated wall when installed so that the door frame can accommodate the corrugations and without gaps being formed in the wall. The door frame can be formed from 16 Gauge steel so that the door assembly is lighter and easier to install. Additionally, the door frame can be assembled in a factory and the door pre-hung so that on-site installation is easier.

Figure 2:
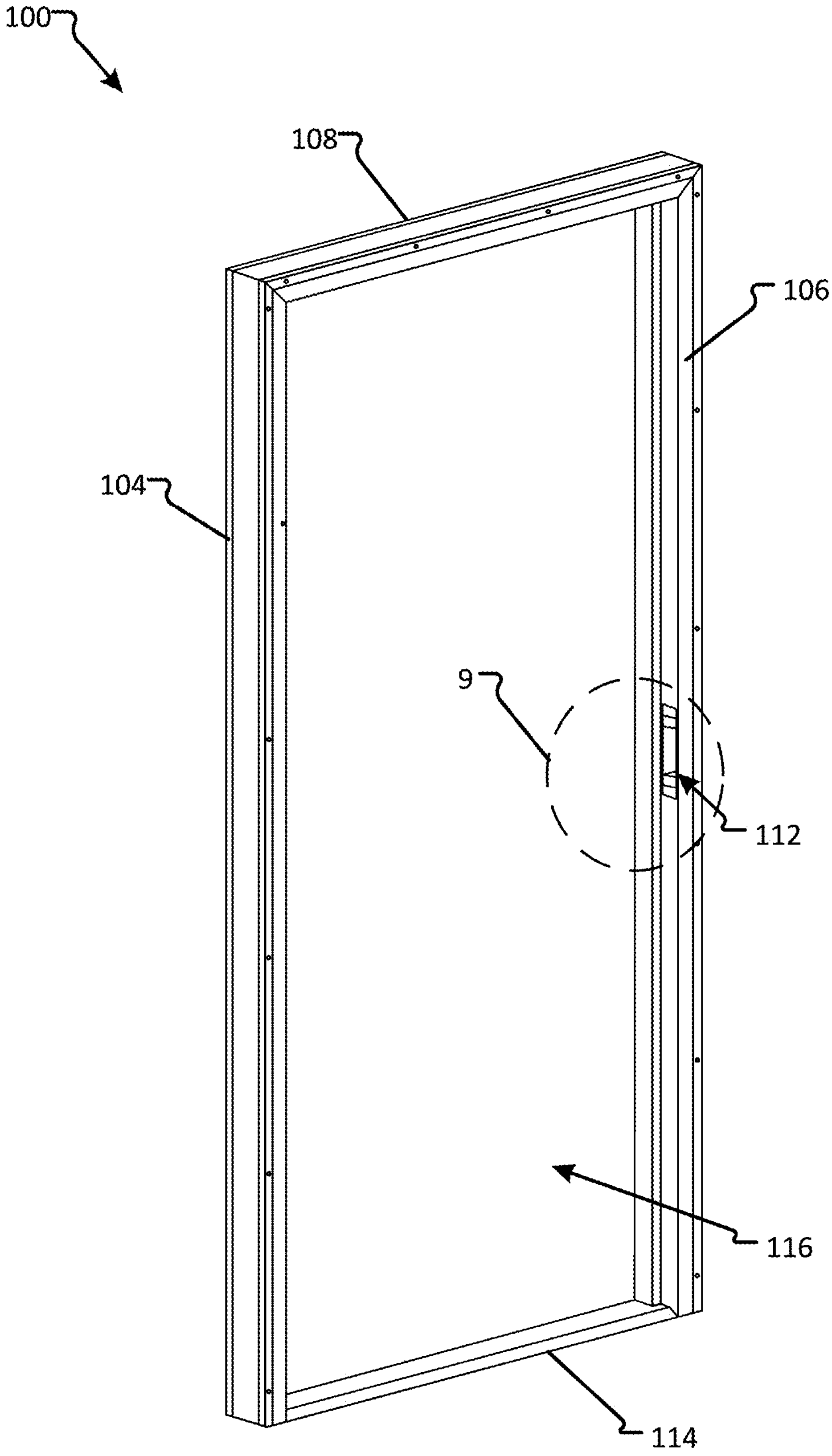
FIG. 2 is another perspective view of the door frame shown in FIG. 1.
Figure 3:
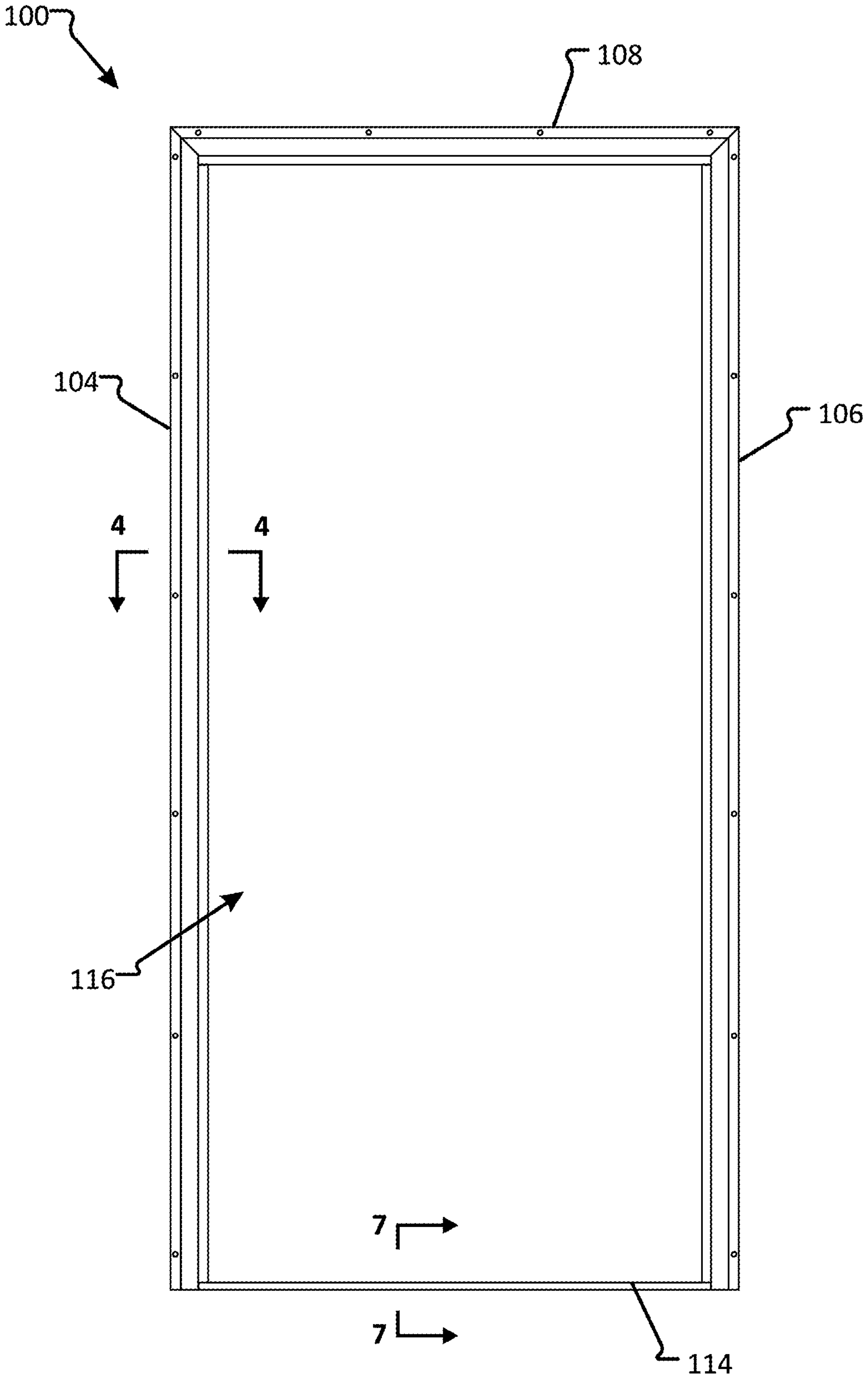
FIG. 3 is an elevation view of the door frame shown in FIG. 1.

FIG. 1 is a perspective view of an exemplary door frame 100. FIG. 2 is another perspective view of the door frame 100. FIG. 3 is an elevation view of the door frame 100. Referring concurrently to FIGS. 1-3, the door frame 100 is configured for a pre-hung door 102 (shown in FIG. 10). The door frame 100 includes a first side jamb 104, an opposite second side jamb 106, and a header 108 spanning between the side jambs 104, 106. The first side jamb 104 includes one or more hinge cutouts 110 for at least partially receiving hinges of the door 102. The second side jamb 106 includes a strike cutout 112 for at least partially receiving a keeper for a latch of the door 102. A sill 114 is disposed opposite the header 108 and also extends between the side jambs 104, 106. Interior portions of the side jambs 104, 106, the header 108, and the sill 114 define an interior space 116 configured to receive the door 102 that is supported by the door frame 100. Exterior portions of the side jambs 104, 106, and the header 108 are configured to be mounted to a corrugated wall 118 (shown in FIG. 11) of a building structure as described herein. In an aspect, the header 108 does not include and is free from any cutouts, such as the strike cutout 112 and/or hinge cutouts 110.

Figure 4:
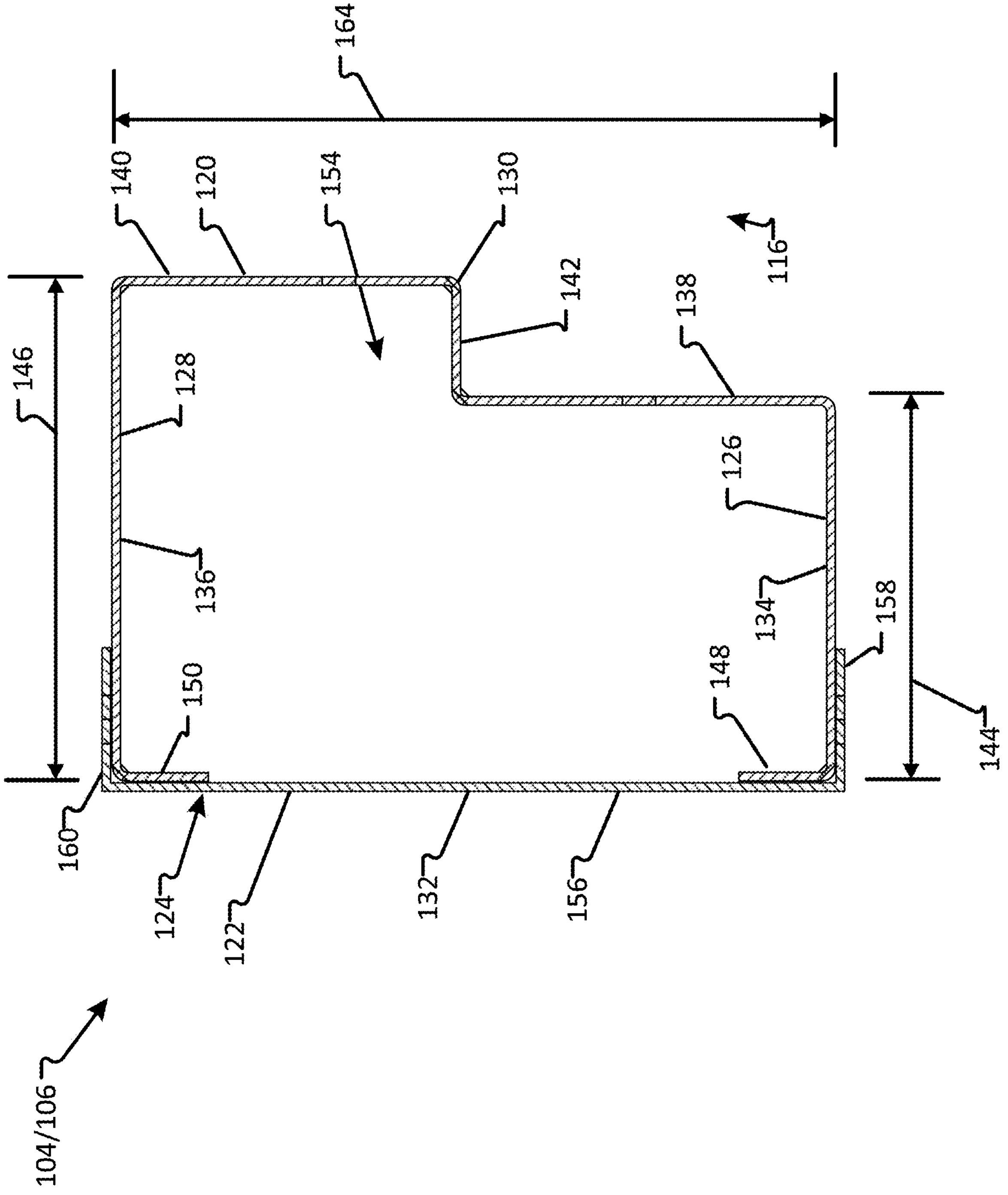
FIG. 4 is a cross-sectional view of a side jamb of the door frame taken along line 4-4 in FIG. 3.
Figure 5:
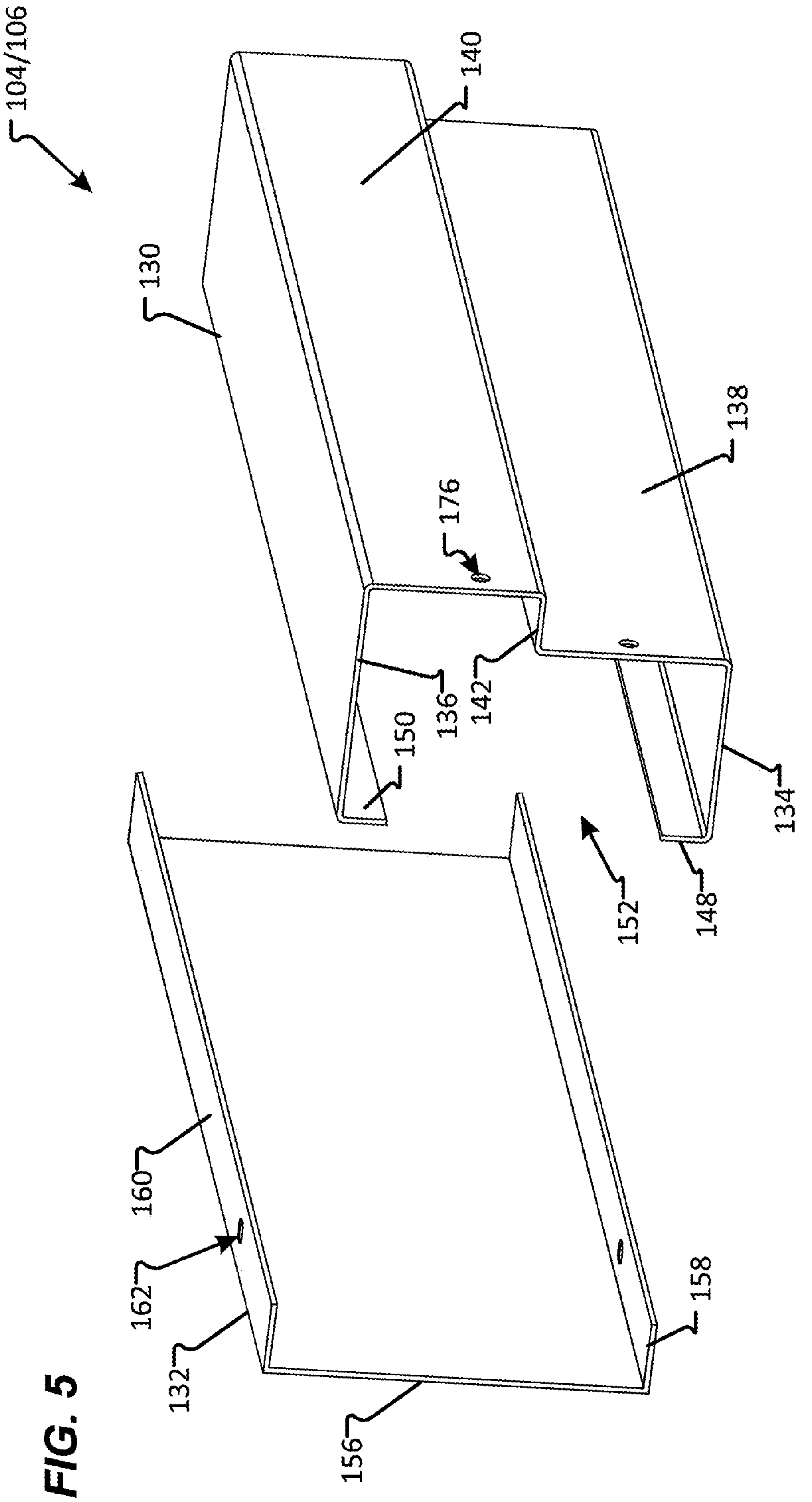
FIG. 5 is an exploded perspective view of the side jamb shown in FIG. 4.

FIG. 4 is a cross-sectional view of a side jamb 104, 106 of the door frame 100 (shown in FIGS. 1-3) and taken along line 4-4 in FIG. 3. FIG. 5 is an exploded perspective view of the side jamb 104, 106. Referring concurrently to FIGS. 4 and 5, it is appreciated that while the side jamb 104, 106 is illustrated, in the example, the header 108 (shown in FIGS. 1-3) has a similar cross-section profile to that described below. The jamb includes an interior wall 120 that faces the door 102 (shown in FIG. 10) and at least partially defines the interior space 116. An exterior wall 122 is configured to provide an exterior surface 124 for mounting the door frame 100 to the corrugated wall 118 (shown in FIG. 11). The jamb also includes a first side wall 126 and an opposite second side wall 128 that each extends between the interior and exterior walls 120, 122. The walls 120, 122, 126, and 128 are substantially rectangular in shape, with the interior wall 120 and the exterior wall 122 parallel to each other, and the first side wall 126 and the second side wall 128 parallel to each other.

As used herein, interior and exterior areas of the door frame 100 are being used to refer to the position of the door within the door frame 100 and not relative to interior and exterior sides of the corrugated wall 118. It should be appreciated that the door frame 100 may have inside areas (e.g., the second side wall 128) and outside areas (e.g., the first side wall 126) that refer to inside and outside area of the corrugated wall 118. In other examples, the corrugated wall 118 may not define inside and outside areas, but rather a first area and a second area both inside the building structure. In this example, the corrugated wall 118 and door 102 form a boundary between the first area and the second area.

The side jamb 104, 106 is formed with two-piece construction and includes a frame member 130 and a track member 132 that are coupled together to form the side jamb 104, 106 for the door 102. The frame member 130 is formed with a plurality of wall portions that are orthogonal to each other. In the example, the frame member 130 includes a first frame face 134 and an opposite second frame face 136. The first frame face 134 is parallel to the second frame face 136. The first frame face 134 forms at least a portion of the first side wall 126 and the second frame face 136 forms at least a portion of the second side wall 128. The interior wall 120 is formed by the frame member 130 and extends between the first and second frame faces 134, 136. The interior wall 120 includes a rabbet 138 defined proximate the first frame face 134 and a soffit 140 defined proximate the second frame face 136.

The rabbet 138 defines a recess within the interior wall 120 and so as to at least partially receive the door 102. The soffit 140 is a projection of the interior wall 120. A stop portion 142 extends between the rabbet 138 and the soffit 140 and is configured to restrict the door 102 from swinging all the way through the door frame 100. The stop portion 142 is disposed between and is substantially parallel to the first and second frame faces 134, 136. The rabbet 138 and the soffit 140 portions are substantially parallel to each other while being offset relative to one another via the stop portion 142. The first frame face 134 has a first frame width 144 and the second frame face 136 has a second frame width 146, the first frame width 144 is less than the second frame width 146. As such, the second frame width 146 is greater than the first frame width 144.

A first return 148 extends orthogonally from the first frame face 134 and opposite the rabbet 138. A second return 150 extends orthogonally from the second frame face 136 and opposite the soffit 140. The first return 148 and the second return 150 are substantially parallel to the interior wall 120. The first return 148 and the second return 150 define a throat opening 152 that allows access into an interior cavity 154 of the frame member 130 from the side. Because of the throat opening 152, the frame member 130 alone does not provide an exterior surface for the corrugated wall 118 to be secured to the frame member 130 at the location of the exterior wall 122. As such, the track member 132 is coupled to the frame member 130 so as to enclose the interior cavity 154 and cover the throat opening 152.

The track member 132 is a substantially U-shaped channel having a base 156 with a first leg 158 and a second leg 160 extending from each respective end of the base 156. In the example, the first and second legs 158, 160 extend in the same direction and are substantially parallel to each other. The first and second legs 158, 160 are orthogonal to the base 156. The outside surface of the track member 132 provides the exterior surface 124 for the door frame 100 that allows the corrugated wall 118 to be more easily secured to the side jamb 104, 106 as described herein.

In the example, the first leg 158 covers at least a portion of the first frame face 134 and may form a portion of the first side wall 126. The first return 148 is positioned against the inside of the base 156 of the track member 132. The second leg 160 covers at least a portion of the second frame face 136 and may form a portion of the second side wall 128. The second return 150 is positioned against the inside of the base 156 of the track member 132. The base 156 of the track member 132, along with the first and second returns 148, 150, form the exterior wall 122 of the side jamb 104, 106 and the outside of the base 156 forms a substantially planar exterior surface 124 for securing the side jamb 104, 106 to the corrugated wall 118. Additionally, the track member 132 covering the throat opening 152 provides weather resistance to the side jamb 104, 106 and creates a seal for the door frame 100. As such, the interior cavity 154 is configured to be at least partially sealed. In some examples, insulation material(s) may be disposed within the interior cavity 154.

While FIGS. 4 and 5 illustrate the first and second side jambs 104, 106 being formed from the frame member 130 and the track member 132, it should be appreciated that in the example, the header 108 (shown in FIGS. 1-3) is also formed in a similar manner and includes the frame member 130 and the track member 132. Thus, the header 108 also includes an exterior planar surface for securing to the corrugated wall 118. In other examples, the header 108 may take on other cross-sectional forms (e.g., a square or rectangle) and that provides the planar exterior surface 124 described herein.

In the example, the track member 132 may be welded to the frame member 130 so as to couple the two members together. In an example, the track member 132 may be spot welded (e.g., not a continuous weld) to the frame member 130 at predetermined spacing intervals. As shown in FIG. 5, the first and second legs 158, 160 of the track member 132 may include one or more holes 162 for use in spot welding the track member 132 to the frame member 130. The holes 162 enable for two parallel portions of the members to be secured together and which facilitates ease of manufacturing. Additionally, the holes 162 position the weld locations away from the exterior surface 124 of the side jamb 104, 106 so that the corrugated wall 118 is not mounted directly to a weld location.

Both the frame member 130 and the track member 132 may be formed from steel. In an aspect, the steel may be galvanized to protect the door frame from environmental elements that cause corrosion and rust. In other aspects, the frame member 130 or track member 132 may be formed from aluminum, stainless steel, or other appropriate building materials. In examples, the frame member 130 and the track member 132 may be between 10 and 22 Gauge steel. In an aspect, the frame member 130 and the track member 132 may be at least 16 Gauge steel. In the example, both the frame member 130 and the track member 132 both are formed from 16 Gauge steel. In other examples, the frame member 130 and the track member 132 may be formed from different gauged steel as required or desired. For example, the track member 132 may be formed from a lower gauge steel than the frame member 130. By using 16 Gauge steel the door frame 100 is much lighter than if the door frame is formed out of HSS tube-steel members. For example, the door frame 100 may weigh around 52-pounds and a single person can move the door frame 100 around and even with the door therein.

In the example, the cross-sectional profile of the frame member 130 and the track member 132 may be formed via a bending and a cutting and/or punching process. In other examples, the frame member 130 and/or the track member 132 may be formed from materials that allow for other types of manufacturing processes, such as, but not limited to, extrusion processes, additive manufacturing processes, etc.

A depth 164 of the side jamb 104, 106 is defined between the first frame face 134 and the second frame face 136 can be sized for the corrugated wall 118 and door 102 used. In one example, the depth 164 may be 4¾ inches. In another example, the depth 164 may be 3¾ inches. A depth 164 of 3¾ inches may be utilized in the case of typical depth of corrugations in the corrugated wall to which the door frame 100 is installed, and utilized in a corrugated wall of a shipping container. In such cases, the reduced depth may be advantageous in that it reduces the extent to which the door frame 100 extends into an interior of a shipping container. This reduces the effective interior space within that container and/or allows a thinner wall finishing to be applied on an interior wall of the shipping container over the corrugated surface, when such finishing is desirable (e.g., in retrofit applications converting shipping containers into occupiable building components).

Figure 6:
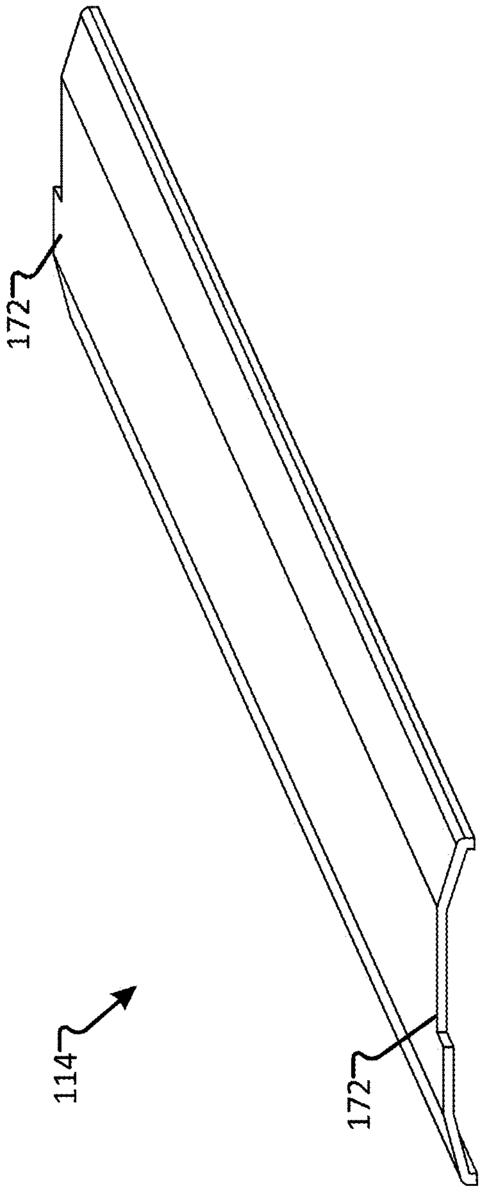
FIG. 6 is a perspective view of a sill of the door frame shown in FIGS. 1-3.
Figure 7:
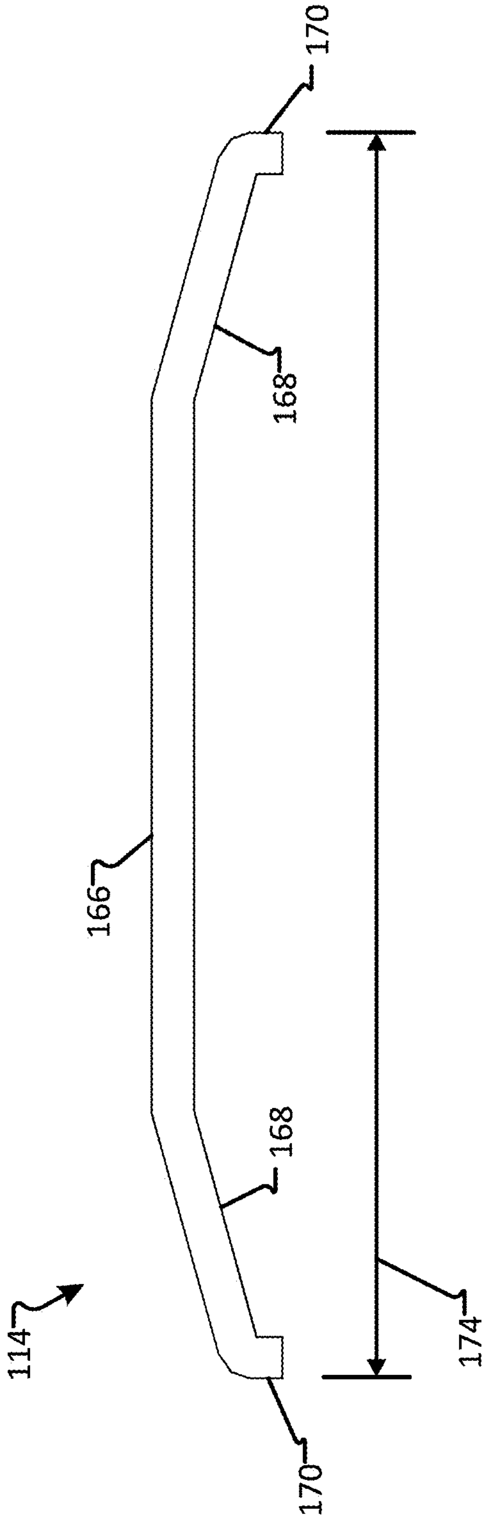
FIG. 7 is a cross-sectional view of the sill taken along line 7-7 in FIG. 3.

FIG. 6 is a perspective view of the sill 114 of the door frame 100 (shown in FIGS. 1-3). FIG. 7 is a cross-sectional view of the sill 114 and taken along line 7-7 in FIG. 3. Referring concurrently to FIGS. 6 and 7, the sill 114 is configured to extend between the first and second side jambs 104, 106 (shown in FIGS. 1-3) of the door frame 100 and opposite the header 108. The sill 114 provides a threshold for the door frame 100. In the example, the sill 114 includes a planar section 166, oblique sections 168 extending from each end of the planar section 166, and returns 170 extending from the distal ends of the oblique sections 168. The sill 114 forms an ADA compliant threshold for the door 102 (shown in FIG. 10). In examples, the returns 170 allows for flashing (not shown) to be attached to the sill 114. End profiles 172 of the sill 114 are shaped and sized to correspond to the interior wall 120 (shown in FIG. 4) of the side jambs 104, 106. In an aspect, a depth 174 of the sill 114 between the returns 170 is greater than the depth 164 (shown in FIG. 4) of the side jambs 104, 106.

Referring back to FIG. 5, the bottom ends of the side jambs 104, 106 may include holes 176 within the rabbet 138 and the soffit 140 to facilitate coupling the sill 114 at the bottom end of the side jambs 104, 106. In examples, the sill 114 can be formed from a galvanized steel similar to the door frame 100. In other examples, the sill 114 may be formed from a different material as required or desired from the door frame 100. The planar section 166 is configured to have the door 102 directly above, and thus, the sill 114 can accommodate a door sweep and/or seal (not shown).

Figure 8:
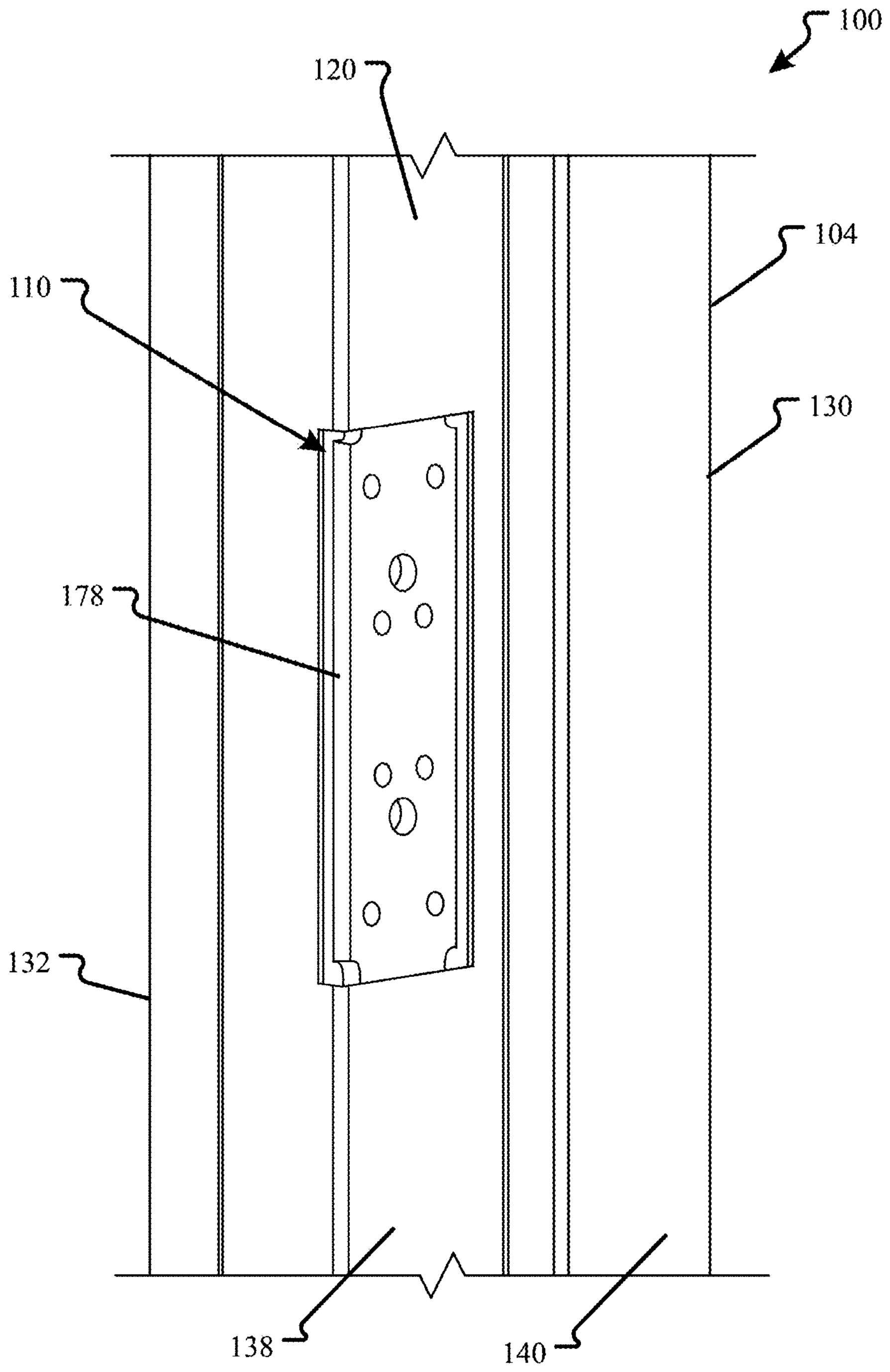
FIG. 8 is an enlarged view of a hinge cutout of the door frame and taken along line 8 in FIG. 1.

FIG. 8 is an enlarged view of the hinge cutout 110 of the door frame 100 and taken along line 8 in FIG. 1. The hinge cutout 110 is formed in the first side jamb 104 of the door frame 100. The hinge cutout 110 is formed in the rabbet 138 of the interior wall 120 of the frame member 130. A plurality of hinge cutouts 110 may be provided and spaced vertically along the first side jamb 104. The hinge cutout 110 is configured to at least partially receive a hinge (not shown) of the door 102 (shown in FIG. 10). A hinge plate 178 may be disposed within the interior cavity 154 (shown in FIG. 4) of the first side jamb 104 and mounted to the frame member 130. The hinge plate 178 extends across the hinge cutout 110 and provides structure for the hinge to be mounted, while also enabling the hinge to be at least partially recessed within the rabbet 138 and create a tightly hung door 102. The hinge plate 178 also provides reinforcement structure to the hinge cutout 110. Also illustrated in FIG. 8, the track member 132 is coupled to the frame member 130 and forms the exterior surface of the door frame 100.

Figure 9:
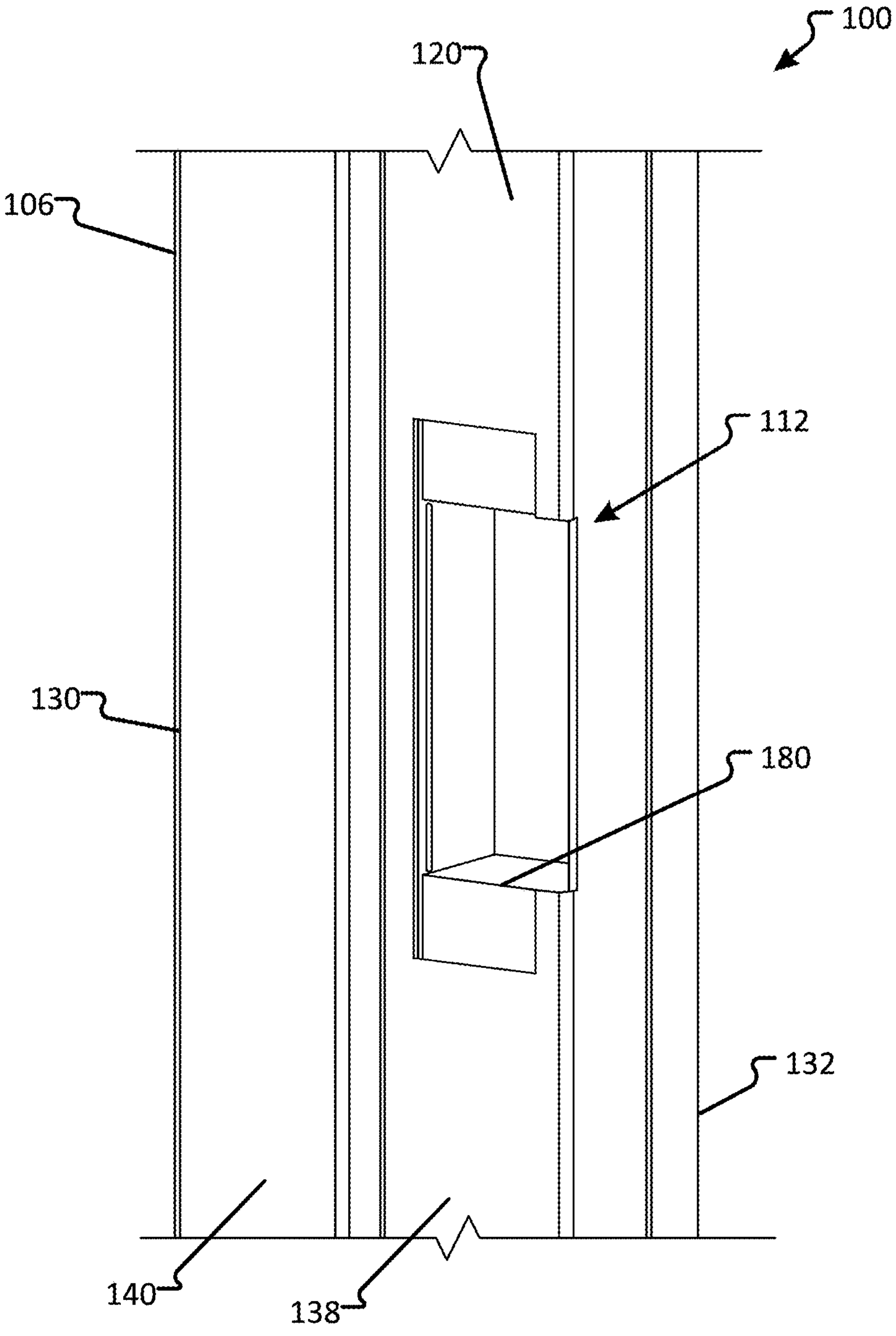
FIG. 9 is an enlarged view of a strike cutout of the door frame and taken along line 9 in FIG. 2.

FIG. 9 is an enlarged view of the strike cutout 112 of the door frame 100 and taken along line 9 in FIG. 2. The strike cutout 112 is formed in the second side jamb 106 of the door frame 100. The strike cutout 112 is formed in the rabbet 138 of the interior wall 120 of the frame member 130. A single strike cutout 112 may be provided and are configured to engage with one or more latches of the door 102 (shown in FIG. 10). In other examples, more than one strike cutout 112 may be used (e.g., one for a door latch and one for a door deadbolt (both not shown)). A strike box 180 may be disposed within the interior cavity 154 (shown in FIG. 4) of the second side jamb 106 and mounted to the frame member 130. The strike box 180 extends across the strike cutout 112 and enables the strike box 180 to be at least partially recessed within the rabbet 138 and create a tightly hung door 102. Also illustrated in FIG. 9, the track member 132 is coupled to the frame member 130 and forms the exterior surface of the door frame 100.

Figure 10:
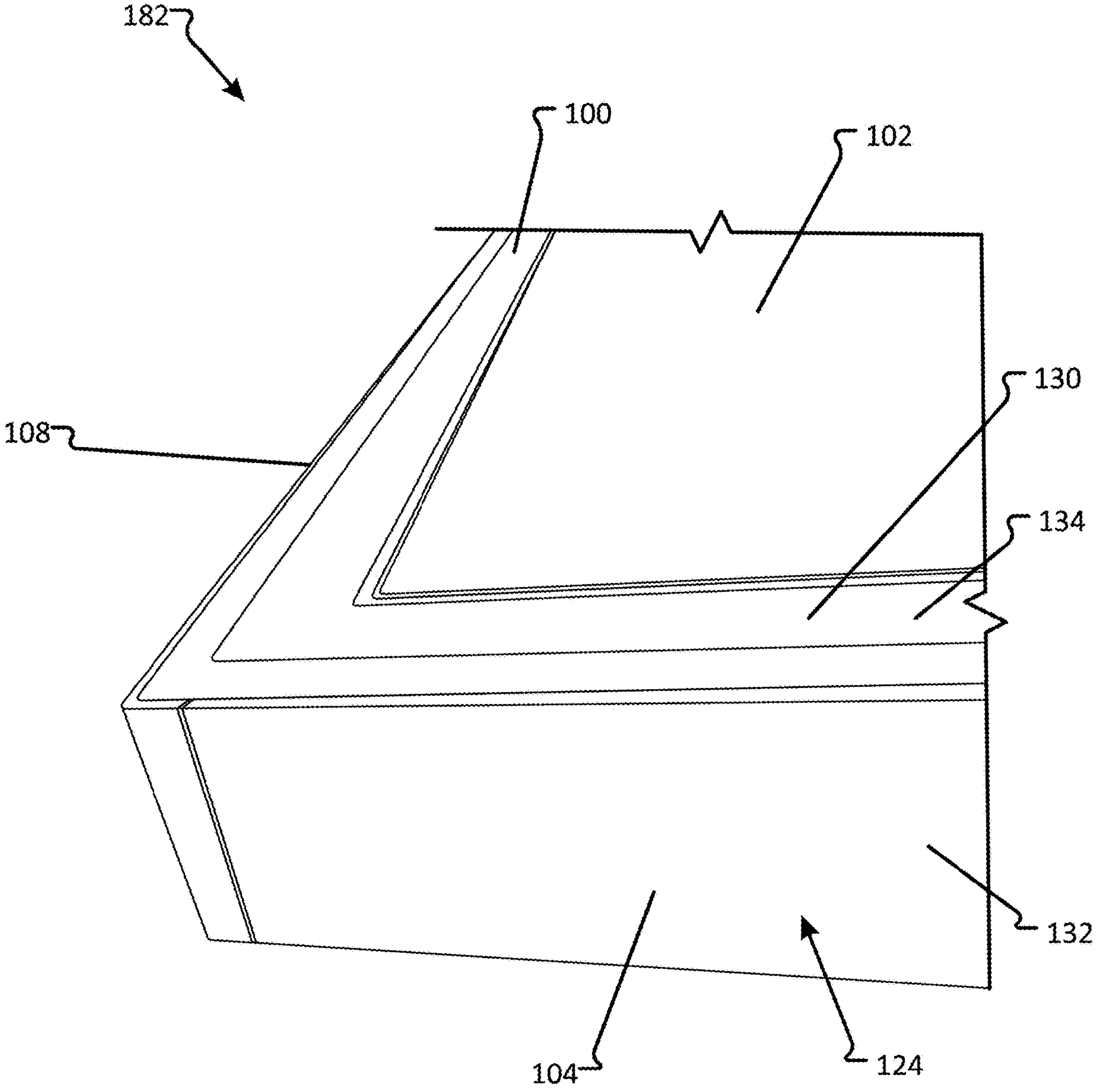
FIG. 10 is a partial perspective view of an exemplary pre-hung door assembly and in accordance with the principles of the present disclosure.

FIG. 10 is a partial perspective view of an exemplary pre-hung door assembly 182. The door assembly 182 includes the door frame 100 that is described above in reference to FIGS. 1-9 and the door 102. As illustrated in FIG. 10, a portion of the header 108 and a portion of the first side jamb 104 is illustrated. The door 102 is in a closed position and positioned at least partially within the rabbet 138 (shown in FIG. 4) of the door frame 100. This configuration enables the first frame face 134 to be substantially flush with the door 102 when the door 102 in the closed position. The track member 132 is shown coupled to the frame member 130 and the track member 132 forms the exterior surface 124 for the door assembly 182 to be installed in a corrugated wall 118 (shown in FIG. 11).

The door 102 may be a metal door and in some examples be formed out of galvanized steel. In an aspect, the door 102 may be a 20 Gauge steel door. In examples, the door 102 may be insulated (e.g., polystyrene) as required or desired. As illustrated, a single door is hung within the door frame 100. In other examples, double doors may be hung within the door frame 100. The door 102 is pre-hung within the door frame 100 so the door assembly 182 can be more efficiently installed. The pre-hung door assembly 182 is easily shipped and assembly can be controlled in the factory. In other examples, the door 102 and door frame 100 may be shipped as a disassembled kit and assembled on-site as required or desired.

In the example, the door 102 is positioned towards the first frame face 134 and the door 102 is pulled outward from the first frame face 134 to open. The first frame face 134 may correspond to an outside area of the corrugated wall 118.

Figure 11:
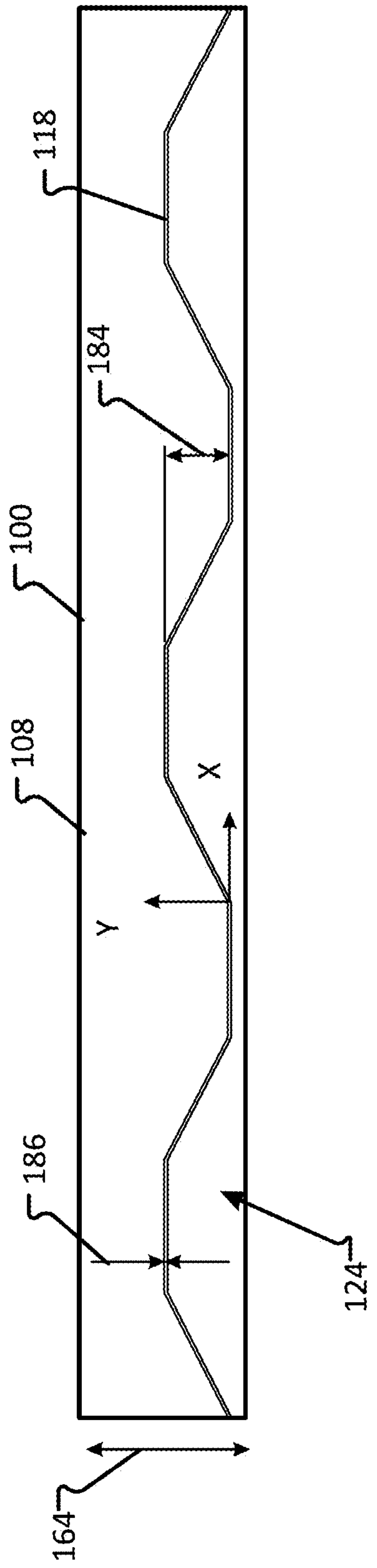
FIG. 11 is a schematic, top plan view of a corrugated wall and the door frame shown in FIGS. 1-3.

FIG. 11 is a schematic, top plan view of the corrugated wall 118 and the door frame 100. As illustrated, the exterior surface 124 of the header 108 of the door frame 100 is illustrated. The corrugated wall 118 has a corrugation depth 184 and a thickness 186. In the example, the corrugated wall 118 may be a portion of a modular building structure such as a shipping container. It is appreciated that corrugated walls 118 may be part of many other different building structures. Additionally, while one type of corrugation is illustrated, corrugated walls 118 are known to have a wide variety of shapes and sizes.

In general, the corrugated wall 118 is an uneven wall (e.g., has both x and y axis components), and thus, providing a flange planar in the x-axis direction as previously known with pre-hung door assemblies results in gaps formed between the flange and the wall. In the door frame 100 described herein, the header 108 forms the exterior surface 124 as a planar surface in the x-y plane, and thus, the exterior surface 124 facilitates installing the door frame 100 to the corrugated wall 118 without gaps forming. Similarly, when looking at the exterior surface 124 of the first and second side jambs 104, 106 (shown in FIG. 4), depending on the position of the rough opening within the corrugated wall 118, the distal end of the wall may be anywhere along the depth 184 of the corrugated wall 118. As such, by providing the exterior surface 124, the door frame 100 can be installed without gaps forming. As shown in FIG. 11, the corrugated wall 118 may be positioned closer to the first frame face than the second frame face.

As described above, a depth of 3¾ inches may be utilized so as to reduce the extent to which the door frame 100 extends into an interior of the shipping container. This reduces the effective interior space within the container and/or allows a thinner wall finishing to be applied on an interior space within that container and/or allows a thinner wall finishing to be applied on an interior wall of the shipping container over the corrugated surface, when such a finishing is desirable.

Figure 12:
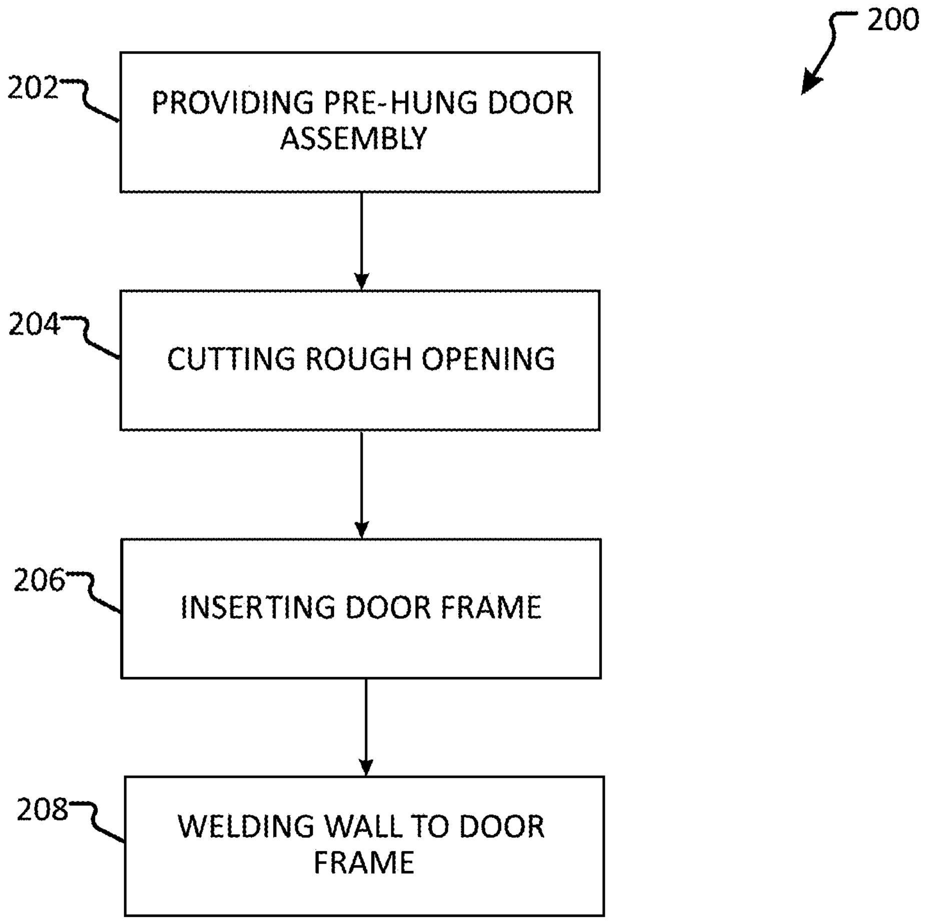
FIG. 12 is a flowchart illustrating an exemplary method of installing a pre-hung door assembly.

FIG. 12 is a flowchart illustrating an exemplary method 200 of installing a pre-hung door assembly. In the example, the pre-hung door assembly is installed on a modular building, such as a shipping container, having a corrugated wall. It is appreciated that corrugated walls may be found in many other different types of building structures and the pre-hung door assembly may be desired to be installed in any other type of building structure. The pre-hung door assembly may be the same or similar to the door assembly 182 with the door 102 and door frame 100 described above and in reference to FIGS. 1-11.

The method may begin with providing the pre-hung door assembly (operation 202). In the example, the pre-hung door assembly may be assembled in a factory and shipped to the site of the modular building. In other examples, the pre-hung door assembly may be shipped as a kit and assembled on-site as required or desired. The pre-hung door assembly includes a steel door frame with a frame member and a track member. The frame member has a first frame face, and opposing second frame face, an interior wall extending between the first and second frames faces, the interior wall including a rabbet and a soffit, a first return extending from the first frame face, and a second return extending from the second frame face. The first and second returns are disposed opposite the interior wall and define a throat opening allowing access into an interior cavity of the frame member. The track member is coupled to the frame member enclosing the interior cavity of the frame member. The track member includes a base and two legs extending from each end of the base with the base covering the throat opening of the frame member. The pre-hung door assembly also includes a metal door mounted at least partially within the rabbet of the frame member.

A rough opening is cut on the corrugated wall of the modular building (operation 204). The tools for cutting the corrugated wall are known to one of ordinary skill in the art and may include, for example, an angle grinder, reciprocating saw, plasma cutter, or the like. The rough opening in the corrugated wall is sized to receive the exterior surface of the door frame and the door frame size is based on the door being hung therein (e.g., a single door, a double door, and the various door sizes thereof).

Once the rough opening is cut, the steel door frame is at least partially inserted within the rough opening of the corrugated wall (operation 206). An exterior surface of the base of the track member is substantially planar for receiving the cut edge corrugations of the corrugated wall. When the door frame is positioned within the rough opening, the exterior surface of the track member is substantially orthogonal to the corrugated wall. The door frame is at least partially sealed, thereby providing a weather seal at the corrugated wall. Additionally, the door frame may include a sill that provides a threshold for the pre-hung door assembly.

The corrugated wall may then be welded to the exterior surface of the base of the track member (operation 208) so as to secure the door frame within the rough opening. The exterior surface of the door frame provides a square surface that accommodates the uneven corrugations. Once the door frame is secured to the corrugated wall, sheathing and/or molding may be installed as required or desired. By utilizing the door frame construction described herein, there is no longer a need to fabricate a tubular steel frame on-site for the rough opening and then also add a door to the tubular steel frame. Accordingly, installation time and costs are reduced. For example, by using the pre-hung door assembly, at least an hour or two of welding and frame fabrication is eliminated, in addition to material allocation time.

References in the specification to "one example," "an example," "an illustrative example," etc., indicate that the example described may include a particular feature, structure, or characteristic, but every example may or may not necessarily include that particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C). Moreover, one having skill in the art will understand the degree to which terms such as "about," "approximately," or "substantially" convey in light of the measurements techniques utilized herein. To the extent such terms may not be clearly defined or understood by one having skill in the art, the term "about" shall mean plus or minus ten percent.

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

What is claimed:

1. A door frame for a pre-hung door comprising:
- a header spanning between a pair of side jambs, wherein each of the pair of side jambs include:
  - a frame member including:
    - a first frame face and an opposing second frame face;
    - a rabbet defined proximate the first frame face such that the first frame face has a first frame width, the rabbet configured to at least partially receive the pre-hung door;

a soffit defined proximate the second frame face such that the second frame face has a second frame width, the second frame width being greater than the first frame width; and a first return extending from the first frame face opposite the rabbet and a second return extending from the second frame face opposite the soffit, the first return and the second return defining a throat opening allowing access into an interior cavity of the frame member; and a track member coupled to the frame member enclosing the interior cavity of the frame member, the track member including:

a base and two legs extending from each end of the base, the two legs covering at least a portion of a respective face of the first or second frame faces;

an outside surface wherein the outside surface provides a substantially planar surface for installing the door frame to a corresponding rough opening on a corrugated wall of a building structure;

wherein the first return is positioned against an inside of the base of the track member opposite the outside surface and the second return is positioned against the inside of the base of the track member, wherein the track member covers the throat opening and the first and second returns, forming a seal at the throat opening at the location of the corrugated wall, when the door frame is installed to the corrugated wall.

2. The door frame of claim 1, wherein the header includes the frame member and the track member.

3. The door frame of claim 1, further comprising a sill disposed opposite of the header between the pair of side jambs.

4. The door frame of claim 1, wherein one side jamb of the pair of side jambs includes at least one hinge cutout disposed at least partially within the rabbet.

5. The door frame of claim 4, wherein another side jamb of the pair of side jambs includes a strike cutout disposed at least partially within the rabbet.

6. The door frame of claim 1, wherein the track member is welded to the frame member.

7. The door frame of claim 1, wherein the interior cavity is at least partially sealed.

8. The door frame of claim 1, wherein the first frame face has a width that is less than a width of the second frame face.

9. The door frame of claim 1, wherein a depth of the frame member between the first and second frame faces is 3¾ inches.

10. The door frame of claim 1, wherein the frame member and the track member are 16 Gauge steel.

11. A pre-hung door assembly comprising:

a steel door frame including a header, a first side jamb, and a second side jamb, wherein each of the header and the first and second side jambs include:

a frame member including:

a first frame face and an opposing second frame face;

an interior wall extending between the first and second frames faces, the interior wall including a rabbet and a soffit; and a first return extending from the first frame face and a second return extending from the second frame face, the first and second returns opposite the interior wall, the first return and the second return defining a throat opening allowing access into an interior cavity of the frame member;

a track member coupled to the frame member enclosing the interior cavity of the frame member, the track member including:

a base and two legs extending from each end of the base, the base covering the throat of the frame member, wherein an outside surface forms an exterior surface of the base that is substantially planar for installing the door frame to a corresponding rough opening on a corrugated wall of a building structure; and a metal door mounted in the rabbet of the frame member;

wherein the first return is positioned against an inside of the base of the track member opposite the outside surface and the second return is positioned against the inside of the base of the track member, wherein the track member covers the throat opening and the first and second returns, forming a seal at the throat opening at the location of the corrugated wall, when the door frame is installed to the corrugated wall.

12. The pre-hung door assembly of claim 11, wherein the first frame face has a width that is less than a width of the second frame face.

13. The pre-hung door assembly of claim 11, wherein the two legs of the track member are welded to a respective face of the respective first or second frame faces of the frame member.

14. The pre-hung door assembly of claim 11, further comprising a sill extending between the first and second side jambs.

15. The pre-hung door assembly of claim 11, wherein the second side jamb includes a strike box.

16. The pre-hung door assembly of claim 11, wherein the interior cavity is at least partially sealed.

17. The pre-hung door assembly of claim 11, wherein a depth of the frame member between the first and second frame faces is 3¾ inches.

18. The pre-hung door assembly of claim 11, wherein the frame member and the track member are 16 Gauge steel.

19. A method of installing a pre-hung door assembly on a modular building having a corrugated wall, the method comprising:

providing the pre-hung door assembly that includes a steel door frame with a frame member and a track member, the frame member having a first frame face and an opposing second frame face, an interior wall extending between the first and second frames faces, the interior wall including a rabbet and a soffit, and a first return extending from the first frame face and a second return extending from the second frame face, the first and second returns opposite the interior wall, the first return and the second return defining a throat opening allowing access into an interior cavity of the frame member, the track member is coupled to the frame member enclosing the interior cavity of the frame member, the track member including a base and two legs extending from each end of the base, the base covering the throat opening of the frame member, wherein the first return is positioned against an inside of the base of the track member and the second return is positioned against the inside of the base of the track member, wherein the track member covers the throat opening and the first and second returns, forming a seal at the throat opening at the location of the corrugated wall, when the door frame is installed to the corrugated wall, the pre-hung door assembly also includes a metal door mounted in the rabbet of the frame member;

cutting a rough opening on the corrugated wall of the modular building;

at least partially inserting the steel door frame within the rough opening, wherein an outside surface provides an exterior surface of the base of the track member that is substantially planar for receiving corrugations of the corrugated wall, wherein the inside is opposite the outside surface; and welding the corrugated wall to the exterior surface of the base of the track member.

20. The method of claim 19, wherein the interior cavity of the steel door frame is at least partially sealed.

* * * * *